Dec. 31, 1963     W. E. SHEARMAN     3,115,781
APPARATUS FOR MEASURING FURNACE TEMPERATURE
Filed Dec. 27, 1960     2 Sheets-Sheet 1

INVENTOR
WILBUR E. SHEARMAN
BY
ATTORNEY

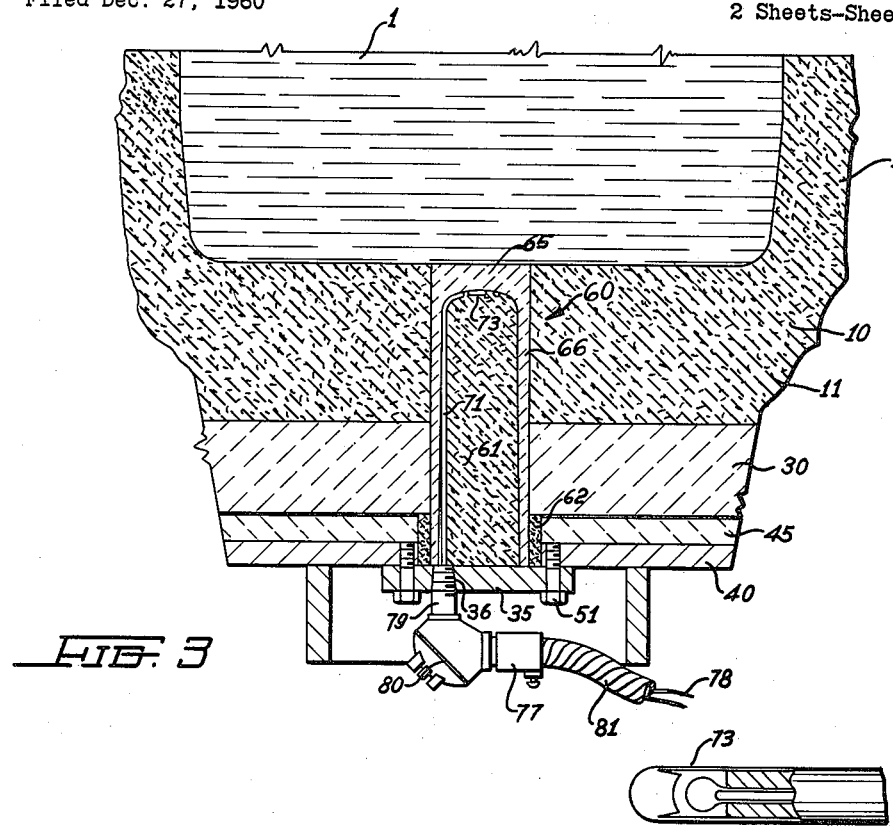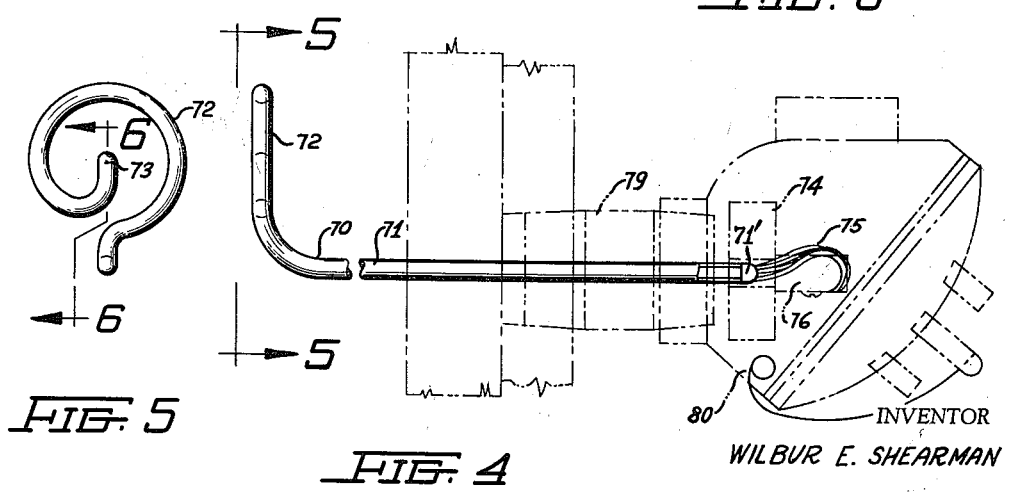

United States Patent Office 3,115,781
Patented Dec. 31, 1963

3,115,781
APPARATUS FOR MEASURING FURNACE TEMPERATURE
Wilbur E. Shearman, Yardley, Ohio, assignor to Ajax Magnethermic Corporation, Youngstown, Ohio, a corporation of Ohio
Filed Dec. 27, 1960, Ser. No. 78,654
8 Claims. (Cl. 73—343)

My invention relates to improvements in the measurement or sensing of temperature of molten metal in vessels, such as metal melting furnaces and more particularly in furnaces of the so-called coreless induction type, and to an improved apparatus and method therefor.

My invention is particularly adapted for use in measuring temperatures of the melt in a coreless induction furnace where high temperature metals or metal alloys, such as aluminum or copper, are being melted, although it is to be understood that the invention is not to be limited thereto.

In prior art coreless furnaces of the type with which I am familiar, conventional immersion type thermocouples have been used which are projected downwardly into the melt. These have proven largely unsatisfactory due to frequent breakage thereof, interference with the charging of certain forms of scrap, and because inaccurate readings can easily result from the proximity of the electromagnetic field. Frequent replacement of such thermocouples has been required.

It is, therefor, an object of my invention to provide an improved means and method for measuring or sensing the melt temperature and to secure an accurate reading of said melt.

It is further an object of my invention to provide an improved means and method for measuring or sensing the melt temperature in a furnace without interference with the charging thereof.

A further object of my invention is to provide an improved means for measuring or sensing the melt temperature in a furnace, which means will be protected throughout its use and which will not be subject to breakage nor require frequent replacement.

A still further object of my invention is to provide an improved means and method for measuring or sensing the temperature of molten metal in a furnace of the so-called "coreless induction type," which will be highly efficient in use, composed of but few parts, and relatively inexpensive.

Still another object of my invention is to provide an improved means for measuring or sensing the temperature of molten metal in a furnace of the type referred to, wherein the measuring element may be readily insertable within and readily removable from said furnace.

These and other objects of my invention will become more readily apparent from a purview of the drawings and the appended description, in which drawings:

FIG. 3 is an enlarged vertical sectional view of a portion of the furnace of FIG. 1, showing the thermocouple assembly;

FIG. 4 is an enlarged view of the thermocouple unit of FIGS. 1 and 3;

FIG. 5 is a view taken on the lines 5—5 of FIG. 4, showing a coiled end of the thermocouple; and FIG. 6 is a fragmentary sectional view taken on the line 6—6 of FIG. 5, showing an end of the thermocouple coil flush with the bottom of the furnace.

Figure 1:
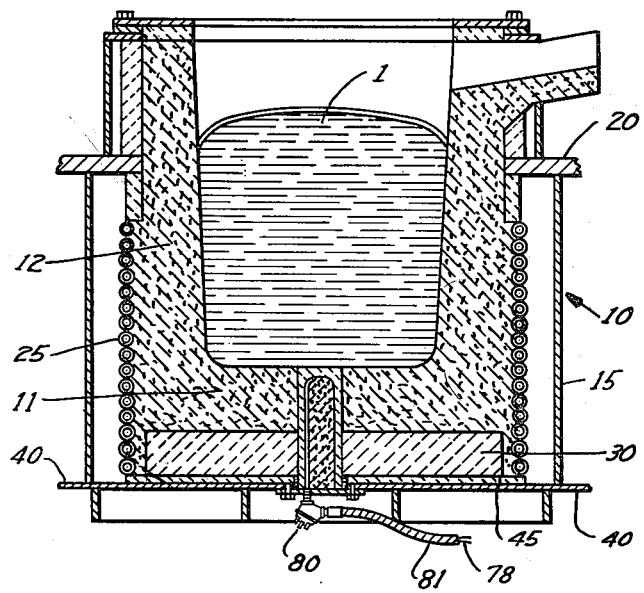
FIG. 1 is a vertical sectional view of a coreless induction furnace showing a modification of my invention incorporated therein.
Figure 2:
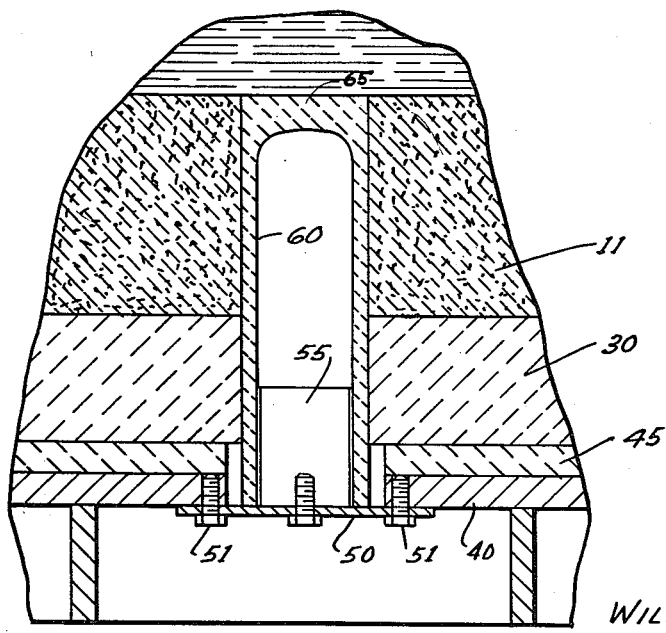
FIG. 2 is an enlarged vertical sectional view of a portion of the furnace of FIG. 1 and illustrating more specifically a thermocouple protection tube, centering mold, and centering plate of my invention.

Referring now to the drawings, in all of which like parts are designated by like reference characters, the improved measurement or "sensing" means of my invention, which in the form shown consists of a thermocouple assembly disposed within a protection tube, is shown disposed vertically through a central portion of the bottom of a "coreless" type furnace.

The furnace may be of various forms, but, as shown, comprises a refractory type melting hearth or crucible 10 having an outer casing 15 formed of steel, or other suitable material, an inductor coil 25 preferably of the water-cooled type surrounding the crucible and supplied with current from a conventional source (not shown). The coil structure may be a single winding as shown, or as shown in co-pending application of Mario Tama Serial No. 771,301, filed November 3, 1958, be made of separate sections, or melt surrounding only a center section thereof being subject to energization by alternating current. The crucible 10 as shown has a base or bottom wall 11 and side walls 12 of refractory material forming a generally cylindrical crucible, although any suitable shape of crucible may be employed. The crucible 10 is shown containing a molten charge, indicated at 1.

The furnace shown comprises a base of insulating fire brick 30, through the protection tube for the sensing means, which in the present modification is shown in the form of a thermocouple coil, projects and said tube when assembled with the furnace is seated upon a cover plate 35 secured to the base of the steel frame shown at 40, said base 40 being spaced from the fire brick base 30, previously noted, by an insulating spacer plate 45 formed of transite or other insulating material.

Referring now more particularly to the improved thermocouple assembly, which constitutes the sensing or measuring means for ascertaining the melt temperature in the furnace and for securing an accurate reading of said melt, a protective tube for the thermocouple, generally indicated at 60, and preferably formed of silicon nitride bonded silicon carbide or like material, is preferably rammed into the furnace at a central portion of the bottom and vertically therethrough by telescoping said open end tube over a preferably cylindrical centering mold 55 secured to a centering plate 50, said centering plate being secured to the base 40 of the frame. The refractory lining 10, 11, 12, forming the hearth is then installed following conventional practice.

After the tube is positioned with the upper surface of its closed end 65 preferably flush with the bottom of the hearth, the centering plate 50 and its associated centering mold 55 is then removed by removal of fastening means, such as hex bolts 51, from the base 40. A thermocouple coil unit 70, as best illustrated in FIGS. 4, 5 and 6, is then inserted within the said protective and melt contacting tube and an elongated generally vertically disposed portion thereof, 71, is positioned to lie substantially flush with an inner face of said tube and to be disposed alongside said tube face and is provided with a preferably coiled end 72 of the thermocouple consisting of one or more turns of coil providing a hot junction 73 at a terminal end thereof and disposed centrally against the inside face of the closed end face of the tube.

Insulation material is then packed into the tube, as shown at 61 in FIGS. 1 and 3, and is packed, as indicated at 62, within the cavity surrounding the lowermost end of the protective tube in the space provided between the outer walls thereof at the lowermost end portion and the transite insulator plate 45 and base of the frame 40. The cover plate 35 is then secured to the base 40 by hex bolts 51 or other fastening means.

The cover plate 35, it will be noted, is provided with a threaded aperture 36 into which a nipple 79 of a thermocouple head assembly 80 is threaded and a potted end 71' of the thermocouple element is disposed within a terminal block 74, thermocouple leads 75 leading outwardly therefrom, said leads being adapted to be connected to a contact panel 76 whereby connection may be made through coupling 77 to leads 78; said leads 78 being encased within a flexible cable 81 and leading to indicating means, or other temperature measuring devices (not shown) in a well-known manner.

The protective tube 60, it will be noted, is a relatively large diameter refractory tube with a melt contacting end face 65 which is of substantial area, being relatively wide, said tube having relatively thin side walls 66 flush with the refractory lining and having insulating material 61 disposed therein of preferably low conductivity. The heat conducted to the end face 65 of the tube must travel to the outer edge thereof and along the tube sides. The length of this path minimizes this conduction and permits the center of the end face to attain near melt temperature. The insulating material provides a barrier to leakage should the protective tube be accidentally broken.

Since the thermocouple element is, in the improved form of my invention, coiled along the inner face of the end face 65 of the tube and the hot junction disposed centrally thereof, the element more readily attains the temperature of the end face and minimizes, or eliminates, any error caused by heat conducted away from the hot junction by the thermocouple wires disposed within the coil element.

The thermocouple furthermore, because of the disposition of the tube within the hearth and substantially flush with the bottom thereof, is adapted to receive or obtain the approximate temperature of the melt and enables the thermocouple to accurately measure the melt temperature.

When melting metals at high temperatures, the thermocouple elements sometimes deteriorate gradually. It is to be noted that the thermocouple element 70 together with insulation 61 and cover plate 35 are easily removable and a new thermocouple element and insulation may be inserted at any time without in any way disturbing the furnace hearth lining.

In operation, in a furnace provided with my improved thermocouple assembly, the heat of the molten metal 1 is transferred to temperature responsive coil section 70 through the substantially flat relatively wide end of the tube 60. An electrical potential dependent upon the temperature is generated in the thermocouple junction and is conveyed by means of thermocouple leads to a potential measuring device (not shown) in a well-known manner. By an accurate determination of melt temperature, the furnace temperature can be controlled to meet prescribed operating conditions.

If the thermocouple element 70 becomes defective for any reason, it can readily be removed from the protective tube by merely unscrewing bolts 51 and removing the cover plate 35.

It will thus be apparent that my thermocouple device has fulfilled the objects of my invention. I have provided a melt temperature measuring or sensing assembly having a protective refractory tube mounted flush with a refractory lining of the furnace, thus eliminating many of the inherent disadvantages of the immersion type thermocouple.

I have provided a protective tube, enclosing my sensing device, which is relatively large in diameter which results in an accurate attainment of the temperature.

Finally, my thermocouple assembly is constructed so that the thermocouple unit 70 is easily inserted and readily removed, thus enhancing the employment thereof.

Since many other modifications within the purview of my invention may readily be apparent to those skilled in the art, it is to be understood that the foregoing is only intended to be an illustration of a preferred embodiment and is not to be considered as a limitation of my invention except as set forth in the appended claims.

What I claim as my invention is:

1. In a furnace, a hearth to hold a molten metal bath, a refractor ylining for said hearth, a refractory tubular element having a closed end face of substantial area seated within the bottom wall of the refractory lining of said hearth and forming an integral part of the said bottom wall lining, said end face being in direct contact with the molten metal bath and being substantially flush therewith, a sensing device disposed within the tubular element and having a coiled end portion disposed against the inner face of the end face of said tubular element and adapted to sense thereby the temperature of the melt.

2. In a furnace, a hearth to hold a molten metal bath, a refractory lining for said hearth, a refractory tubular element having a closed end face of substantial area seated within the bottom wall of the refractory lining of said hearth and forming an integral part of the said bottom lining wall, said end face being in direct contact with the molten metal bath and being substantially flush therewith, a sensing device disposed within the tubular element and having a coiled end portion disposed against the inner face of the end face of said tubular element and adapted to directly sense thereby the temperature of the melt, said tubular element being provided with insulation material of low conductivity.

3. In a coreless induction furnace for melting metals, a hearth, a tubular element of high thermal conductivity seated within a bottom wall of said hearth having a wide closed end face, said end face forming a part of the said bottom wall of the hearth and being in direct contact with the melt and being substantially flush therewith, a thermocouple mounted within said tubular element having a portion thereof disposed along a side wall of said tubular element and having a coiled end portion disposed against the inner face of the end face of said tubular element adapted to sense the temperature of the melt, indicating means associated with said thermocouple adapted to indicate the said temperature.

4. In a coreless induction furnace for melting metals, a hearth, a thermocouple protective tubular element vertically seated within a bottom wall of said hearth having a wide closed end face, said end face forming a part of the said bottom wall of the hearth and being in direct contact with the melt and being substantially flush therewith, a thermocouple mounted within said tubular element having an elongated portion disposed along a side wall of said tubular element and having a coiled end portion disposed against the inner face of the end face of said tubular element adapted to sense the temperature of the melt, the temperature of the hearth melt being transferred to the end portion of the thermocouple through the end face of the tubular element generating an electrical potential dependent upon the temperature in the end portion of the thermocouple, a potential measuring device associated with said thermocouple.

5. In a coreless induction furnace for melting metals, a hearth, a thermocouple protective tubular element vertically seated within a bottom wall of said hearth having a wide closed end face, said end face forming a part of the said bottom wall of the hearth and being in direct contact with the melt and being substantially flush therewith, a thermocouple mounted within said tubular element having an elongated portion disposed along a relatively thin side wall of said tubular element and having a coiled end portion disposed against the inner face of the end face of said tubular element adapted to measure the temperature of the melt.

6. In a coreless induction furnace for melting metals, a hearth, a thermocouple protective tubular element vertically seated within a bottom wall of said hearth having a wide closed end face, said end face forming a part of the said bottom wall of the hearth and being in direct contact with the melt and being substantially flush therewith, a thermocouple coil unit having an elongated vertically disposed portion positioned substantially flush with a side wall of said tube, said thermocouple unit having a coiled end disposed centrally against the inner face of the wide face of the tubular element providing a hot junction at a terminal end thereof adapted to sense the temperature of the melt.

7. In a coreless induction furnace for melting metals, a hearth, a thermocouple protective tubular element of high thermal conductivity vertically seated within a bottom wall of said hearth having a wide closed end face, said end face forming a part of the said bottom wall of the hearth and being in direct contact with the melt and being substantially flush therewith, a thermocouple mounted within said tubular element having an elongated portion disposed along a side wall of said tubular element and having a coiled end portion disposed against the inner face of the end face of said tubular element adapted to measure the temperature of the melt, said tubular element being provided with insulating material therein of low conductivity.

8. In a furnace for melting metals, a hearth, a tubular element of large diameter seated within a wall of the refractory lining of said hearth, having a closed end face of substantial area, said end face forming a part of the lining wall of the hearth and in direct contact with the melt and being substantially flush therewith, a sensing device disposed within the tubular element and having a coiled end portion disposed against the inner face of the wide end face of said tubular element and adapted to sense thereby the temperature of the melt.

References Cited in the file of this patent

UNITED STATES PATENTS

| | | |
|---|---|---|
| 2,048,681 | Davidson | July 28, 1936 |
| 2,151,648 | Baker | Mar. 21, 1939 |
| 2,519,941 | Tama | Aug. 22, 1950 |
| 2,619,409 | Spracklen | Nov. 25, 1952 |
| 2,720,786 | Sawle | Oct. 18, 1955 |
| 2,814,952 | Ryant et al. | Dec. 3, 1957 |
| 2,967,429 | Taylor | Jan. 10, 1961 |